US009596713B2

(12) United States Patent
Sander (10) Patent No.: US 9,596,713 B2
(45) Date of Patent: *Mar. 14, 2017

(54) NETWORK NODE, METHOD, AND MOBILE TERMINAL FOR PROVIDING VOICE CALLS TO A MOBILE TERMINAL IN A PACKET-SWITCHED-ONLY NETWORK (71) Applicant: TELEFONAKTIEBOLAGET L M ERICSSON (PUBL), Stockholm (SE)

(72) Inventor: Ann-Christine Sander, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,838

(22) Filed: Oct. 7, 2015

(65) Prior Publication Data

US 2016/0029428 A1    Jan. 28, 2016

Related U.S. Application Data (63) Continuation of application No. 14/671,122, filed on Mar. 27, 2015, which is a continuation of application
(Continued)

(51) Int. Cl.
*H04L 12/66* (2006.01)
*H04W 76/04* (2009.01)
(Continued)

(52) U.S. Cl.
CPC ......... *H04W 76/04* (2013.01); *H04M 7/0003* (2013.01); *H04W 8/06* (2013.01);
(Continued)

(58) Field of Classification Search
None
See application file for complete search history.

(56) References Cited

U.S. PATENT DOCUMENTS 7,526,320 B2    4/2009  Semper
2002/0061756 A1  5/2002  Bleckert
(Continued)

FOREIGN PATENT DOCUMENTS

GB    2402846 A     12/2004
WO    02093811 A3   11/2002

OTHER PUBLICATIONS

3GPP TS 23.060, V6.8.0; (Mar. 2005); 3rd Generation Partnership Project; Technical Specification Group Services and System Aspects; General Packet Radio Service (GPRS); Service Description; Stage 2 (Release 6).
(Continued)

*Primary Examiner* — Khaled Kassim (57) ABSTRACT

A network node, method, and mobile terminal for providing circuit-switched (CS) voice calls to a mobile terminal operating in a packet-switched (PS)-only network. A control node such as an EPC node in an SAE/LTE PS-only network is modified to mimic the messaging functionality of a Serving GPRS Service Node (SGSN). The EPC node is connected to an MSC/VLR in a CS network through a Gs interface. The EPC node registers the terminal with the MSC/VLR and provides a VLR TMSI to the terminal. When the MSC/VLR receives an incoming CS voice call for the terminal, the MSC/VLR notifies the EPC node, which sends a paging message to the terminal. To set up the CS voice call, the terminal sends a paging response directly to the MSC/VLR.

13 Claims, 6 Drawing Sheets

Related U.S. Application Data

No. 11/428,103, filed on Jun. 30, 2006, now Pat. No. 9,019,953.

(51) Int. Cl.
  *H04W 68/00* (2009.01)
  *H04W 8/06* (2009.01)
  *H04M 7/00* (2006.01)

(52) U.S. Cl.
  CPC ......... *H04W 68/00* (2013.01); *H04W 68/005* (2013.01); *H04M 2207/187* (2013.01)

(56) References Cited

U.S. PATENT DOCUMENTS

| | | |
|---|---|---|
| 2002/0122401 A1 | 9/2002 | Xiang |
| 2003/0143996 A1 | 7/2003 | Peglion |
| 2003/0152048 A1 | 8/2003 | Solninen |
| 2003/0169725 A1 | 9/2003 | Ahmavaara |
| 2004/0058688 A1 | 3/2004 | Silver |
| 2004/0235473 A1 | 11/2004 | Sanchez |
| 2006/0062207 A1 | 3/2006 | Julka |
| 2006/0291455 A1 | 12/2006 | Katz |
| 2007/0091877 A1 | 4/2007 | Lundin |
| 2007/0211693 A1 | 9/2007 | Hirsimaki |
| 2007/0238466 A1 | 10/2007 | Buckley |
| 2007/0238467 A1 | 10/2007 | Buckley |
| 2008/0316998 A1 | 12/2008 | Procopio |
| 2010/0255808 A1 | 10/2010 | Guo |

OTHER PUBLICATIONS

3GPP TS 29.016 V6.0.0 (Dec. 2004); 3rd Generation Partnership Project; Technical Specification Group Core Network; Generatl Packet Radio Service (GPRS); Serving GPRS Support Node (SGSN)—Visitors Location Register (VLR); Gs Interface network service specification (Release 6).

3GPP TS 29.018 V7.2.0 (Mar. 2006); 3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 7).

Vodafone, Signalling free inter-RAT mobility and the CS domain, 3GPP TSG SA WG2 Architecture—S2#51, S2-060795, Denver, Colorado, USA, Feb. 13-17, 2006.

3GPP TR 23.806 W.0.0 3rd Generation Partnership Project; Technical Specification Group Services and System Aspects; Voice Call Continuity between CS and IMS Study (Release 7), Dec. 2005.

NETWORK NODE, METHOD, AND MOBILE TERMINAL FOR PROVIDING VOICE CALLS TO A MOBILE TERMINAL IN A PACKET-SWITCHED-ONLY NETWORK

CROSS-REFERENCE TO RELATED APPLICATIONS

This application is a continuation of co-pending U.S. patent application Ser. No. 14/671,122 filed on Mar. 27, 2015, which is a continuation of U.S. patent application Ser. No. 11/428,103 filed on Jun. 30, 2006, now U.S. Pat. No. 9,019,953, the disclosures of which are fully incorporated herein by reference.

STATEMENT REGARDING FEDERALLY SPONSORED REASEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to communication systems. More particularly, and not by way of limitation, the invention is directed to a network node, method, and mobile terminal for providing voice calls to a mobile terminal operating in a packet-switched-only network.

Wireless networks today, such as second-generation (2G) GSM networks, third-generation (3G) networks, and Wireless Local Area Networks (WLANs) support Packet-Switched (PS) services and/or Circuit-Switched (CS) services. A user in a 2G or 3G network may use either CS services such as speech, or PS services such as Internet Access. The availability of CS and PS services also depends on the terminal. Some devices such as Laptop PC-cards are PS-only devices, while other devices such as older GSM phones without GPRS support are CS-only devices. A user in a PS-only network may use only PS services, although Voice-over-IP (VoIP) is emerging. New wireless networks such as Wimax support only PS and not CS. New standards for PS-only networks are also being investigated by the Third Generation Partnership Project (3GPP) in a feasibility study for System Architecture Evolution/Long Term Evolution (SAE/LTE). The SAE portion of this study is focused on a new core network, while the LTE portion of the study is focused on a new radio network.

General information regarding 2G and 3G networks may be found in the technical specification 3GPP TS 23.060, v.6.13.0. Further information about the Gs interface may be found in the technical specification 3GPP TS 29.018, v. 6.4.0. Further information about SAE/LTE networks may be found in the technical specification 3GPP TS 23.882, v. 1.2.3. Each of these technical specifications is hereby incorporated herein by reference.

Many users, however, prefer CS voice service because the quality of CS voice service is in many cases superior to PS voice quality. Operators may also prefer CS voice services because operators must heavily invest to provide VoIP services.

Some existing networks contain both a CS part and a PS part of the network. An interface known as the Gs interface provides co-ordination between a Mobile Switching Center/Visitor Location Register (MSC/VLR), which handles CS traffic in the CS part of the network, and a Serving GPRS Service Node (SGSN), which handles PS traffic in the PS part of the network. The Gs interface is used by the MSC/VLR for paging the mobile terminal for CS services, for exchanging location information between the CS part and the PS part, and for conveying some CS-related procedures through the SGSN. The Gs interface makes it possible for a mobile terminal supporting both CS and PS services to connect to both services via the PS domain. The Gs interface enables a mobile terminal using a combined CS and PS network to send some messages only to the PS part to save radio transmissions. The PS part then informs the CS part of needed information through signaling to ensure that both the CS and PS parts of the network have the same information about the mobile terminal.

When a mobile terminal is operating in a PS-only network, there are several reasons why the mobile terminal cannot receive CS voice calls. First, there is no mechanism for registering the mobile terminal with an MSC. Second, even if the mobile terminal was registered with an MSC/VLR, there is no signaling mechanism for forwarding paging messages from the MSC/VLR to the mobile terminal. Thus, the mobile terminal cannot be alerted when a CS voice call is incoming. Additionally, the mobile terminal itself lacks the functionality for using more than one radio technology at the same time. Although some high-end mobile terminals are capable of supporting more than one network technology, they cannot use more than one radio technology at the same time because battery consumption or interference issues make it technically impossible. Low-end terminals, where cost is an important issue, are often not designed with this capability due to cost constraints. Thus, the terminal is restricted to using either PS-only data services or CS-only voice services, but not both at the same time. Therefore, if the mobile user is using a PS-only data service, the user cannot receive any CS voice calls.

It should also be noted that networks providing both CS and PS services (such as GSM or WCDMA), generally have better coverage than PS-only networks (such as WLAN). However, PS-only networks generally offer higher bandwidths, perhaps even 100 times higher, than networks providing both CS and PS services. This higher bandwidth can be very useful for applications such as IPTV, video, downloading from the Internet, and the like. When a mobile terminal is using a PS service in a PS-only network, it is technically feasible to maintain the PS service when moving to a combined CS/PS network, if the two networks are operated by the same operator, and if the operator has chosen to implement the network in this way. In the combined CS/PS network, the same radio access technology is utilized for both CS and PS services, and the mobile terminal can receive CS voice calls while running the PS service. However, in most cases, some PS bandwidth capability will be lost. From the bandwidth perspective, it would be beneficial for the terminal to continue to use the PS-only network, but the drawback is that any incoming CS calls to the mobile terminal are lost.

What is needed in the art is a network node, method, and mobile terminal for providing voice calls to a mobile terminal that overcomes the disadvantages of the prior art. The present invention provides such a network node, method, and mobile terminal.

BRIEF SUMMARY OF THE INVENTION

The present invention is a network node, method, and mobile terminal for providing voice calls to a mobile terminal operating in a packet-switched-only network. From the user's perspective, the invention provides the advantage that it enables a mobile terminal to receive CS voice calls when using a PS-only network. From the network operator's perspective, the invention enables the network operator to provide CS voice calls when the mobile users are using PS-only networks. The operator can therefore provide PS-only network services without having to fully implement VoIP services.

In one aspect, the present invention is directed to a method of providing a circuit-switched voice call to a mobile terminal operating in a packet-switched-only network. The method includes mimicking, in a control node in the packet-switched-only network, the messaging functionality of a Serving GPRS Service Node (SGSN); connecting the control node to a mobile switching center/visitor location register (MSC/VLR) in a circuit-switched network through a Gs interface; and forwarding by the control node, a paging message received from the MSC/VLR. The paging message is forwarded to the mobile terminal for direct response to the MSC/VLR.

In another aspect, the present invention is directed to a control node in a packet-switched-only network. The control node includes a packet-switched-only communication unit for wirelessly communicating with a mobile terminal; a SGSN mimic unit for mimicking the messaging functionality of an SGSN; and a Gs interface connection from the SGSN mimic unit to an MSC/VLR in a circuit-switched network.

In another aspect, the present invention is directed to a mobile terminal for receiving a CS voice call while operating in a PS-only network. The mobile terminal includes a packet-switched communication protocol stack for sending and receiving messages with a control node in the PS-only network; a circuit-switched communication protocol stack for sending and receiving messages with an MSC/VLR in a CS network; and a controller for determining when to use the packet-switched communication protocol stack and when to use the circuit-switched communication protocol stack.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention enables a mobile terminal to receive CS voice calls when operating in a PS-only network. This feature is enabled by adding to one or several nodes in the PS-only network, the functionality to act as an SGSN towards a combined CS/PS network with both CS and PS functionality, such as 2G or 3G networks. One or several nodes in the PS-only network then function as an SGSN proxy towards the combined CS/PS network, while requiring minimal or no changes in the combined CS/PS network.

Figure 1:
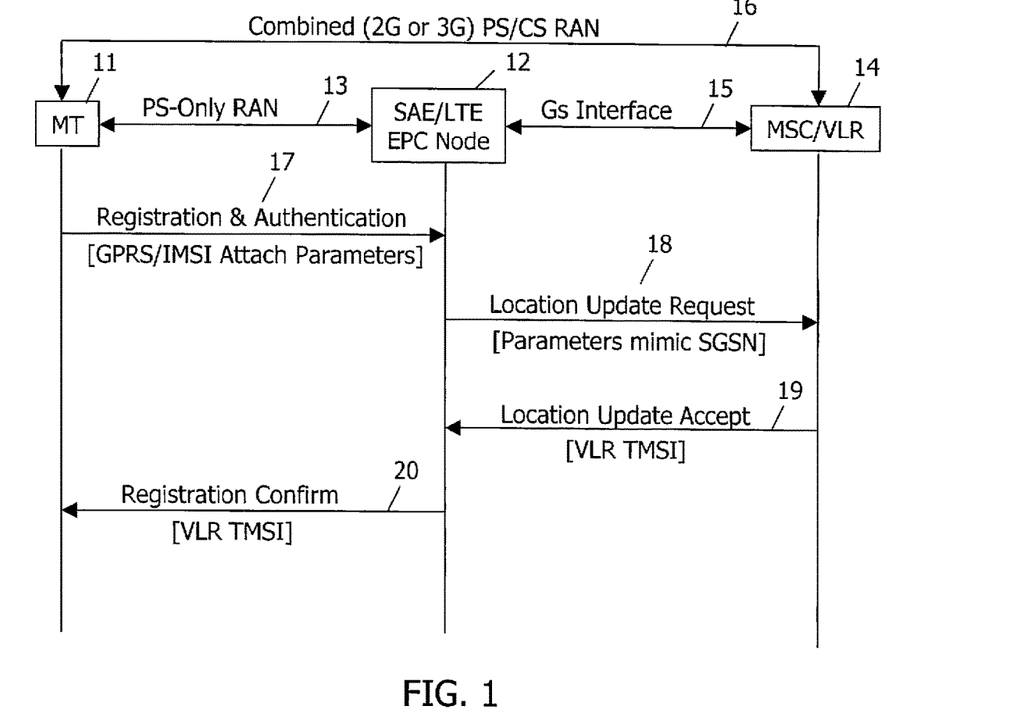
FIG. 1 is a signaling diagram illustrating the flow of messages between various network entities when a mobile terminal registers with a PS-only network in an exemplary embodiment of the system and method of the present invention.

FIG. 1 is a signaling diagram illustrating the flow of messages between various network entities when a mobile terminal (MT) 11 registers with a PS-only network in an exemplary embodiment of the system and method of the present invention. It is assumed that the MT is capable of utilizing a combined PS/CS network (such as a 3G network), and is also capable of utilizing a different PS-only network (such as, for example, an SAE/LTE network). However, the MT is not able to use both networks at the same time. The MT communicates with an SAE/LTE Evolved Packet Core (EPC) node 12 over a PS-only Evolved Radio Access Network (RAN) 13. The term EPC denotes the Core Network and the included nodes needed for SAE. The EPC node, in turn, communicates with a Mobile Switching Center/Visitor Location Center (MSC/VLR) 14 in the combined PS/CS network over the Gs Interface 15. To communicate directly with the MSC/VLR, the MT utilizes a combined (2G or 3G) RAN 16.

At step 17, the MT 11 sends a registration message including authentication information to the EPC node 12. The MT may also include certain parameters, which enable the EPC node to mimic an SGSN. In a typical 2G/3G network registration, the MT would register with an SGSN by sending a combined GPRS and IMSI Attach message to the SGSN. Therefore, to enable the EPC node to mimic or emulate an SGSN, the MT may send the same parameters normally included in the GPRS and IMSI Attach message.

At step 18, the EPC node 12 utilizes the Gs Interface 15 to send a Location Update Request message to the MSC/VLR 14. Included in the message are parameters enabling the EPC node to mimic or emulate an SGSN. At step 19, the MSC/VLR sends a Location Update Accept message to the EPC node. This message acknowledges the Location Update Request and includes a temporary identifier (e.g., VLR TMSI) for the MT. At step 20, the EPC node sends a Registration Confirm message to the MT. This message acknowledges the Registration message 17 and includes several parameters including the VLR TMSI received from the MSC/VLR. The MT stores the VLR TMSI, which is needed for communications with the MSC/VLR.

Figure 2:
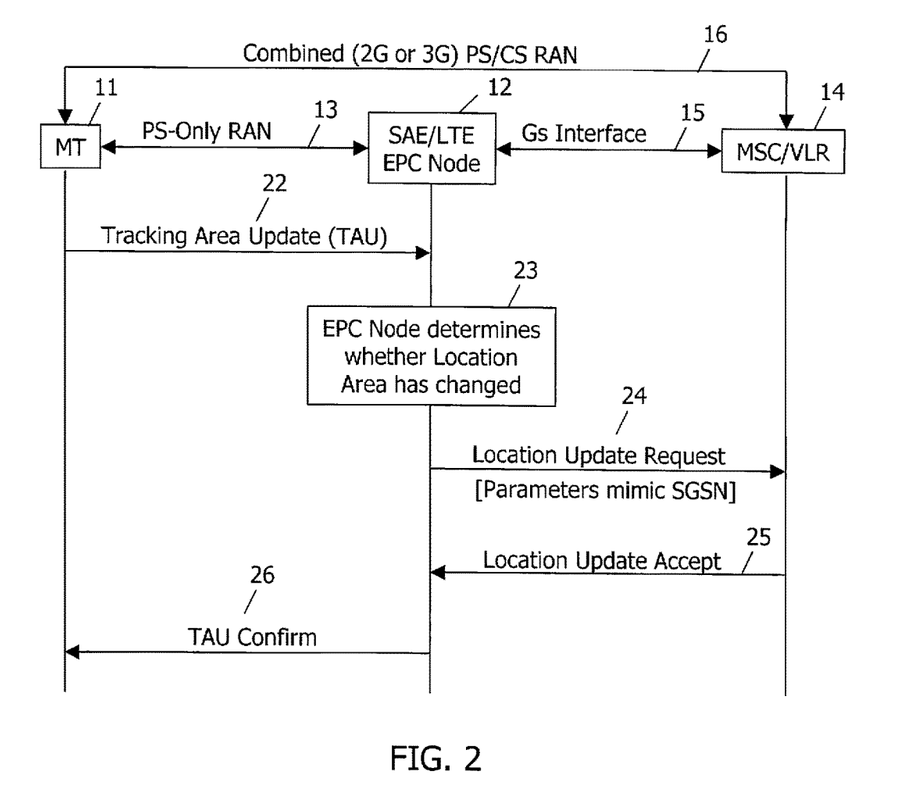
FIG. 2 is a signaling diagram illustrating the flow of messages between various network entities when a mobile terminal performs a Tracking Area Update with a PS-only network in an exemplary embodiment of the system and method of the present invention.

FIG. 2 is a signaling diagram illustrating the flow of messages between various network entities when a mobile terminal performs a Tracking Area Update with a PS-only network in an exemplary embodiment of the system and method of the present invention. If the MT 11 changes Tracking Areas in the PS-only network, the MT reports this fact in a Tracking Area Update (TAU) message 22, which is sent to the EPC node 12. The change of Tracking Areas may or may not equate to a change of Location Areas in the 2G or 3G network. In 2G networks such as GSM, MTs are tracked in Location Areas (LAs) and Routing Areas (RAs). In UMTS (3G) networks, MTs may be tracked in UTRAN Registration Areas (URAs) as well as LAs and RAs. The term "Tracking Area" is used as a generic name for URAs, LAs, and RAs. The EPC node is programmed with information for translating Tracking Areas into the equivalent Location Areas (for example, a TA/LA lookup table), and at step 23, the EPC node determines whether the Location Area has also changed. If the Location Area has changed, the MSC/CLR 14 must be informed. Therefore, at step 24, the EPC node utilizes the Gs Interface 15 to send a Location Update Request message to the MSC/VLR. Included in this message are the parameters necessary to mimic an SGSN. At step 25, the MSC/VLR sends a Location Update Accept message back to the EPC node. At step 26, the EPC node sends a TAU Confirm message back to the MT. Note that this message is sent to acknowledge the TAU message 22 regardless of whether the Location Area was changed.

Figure 3:
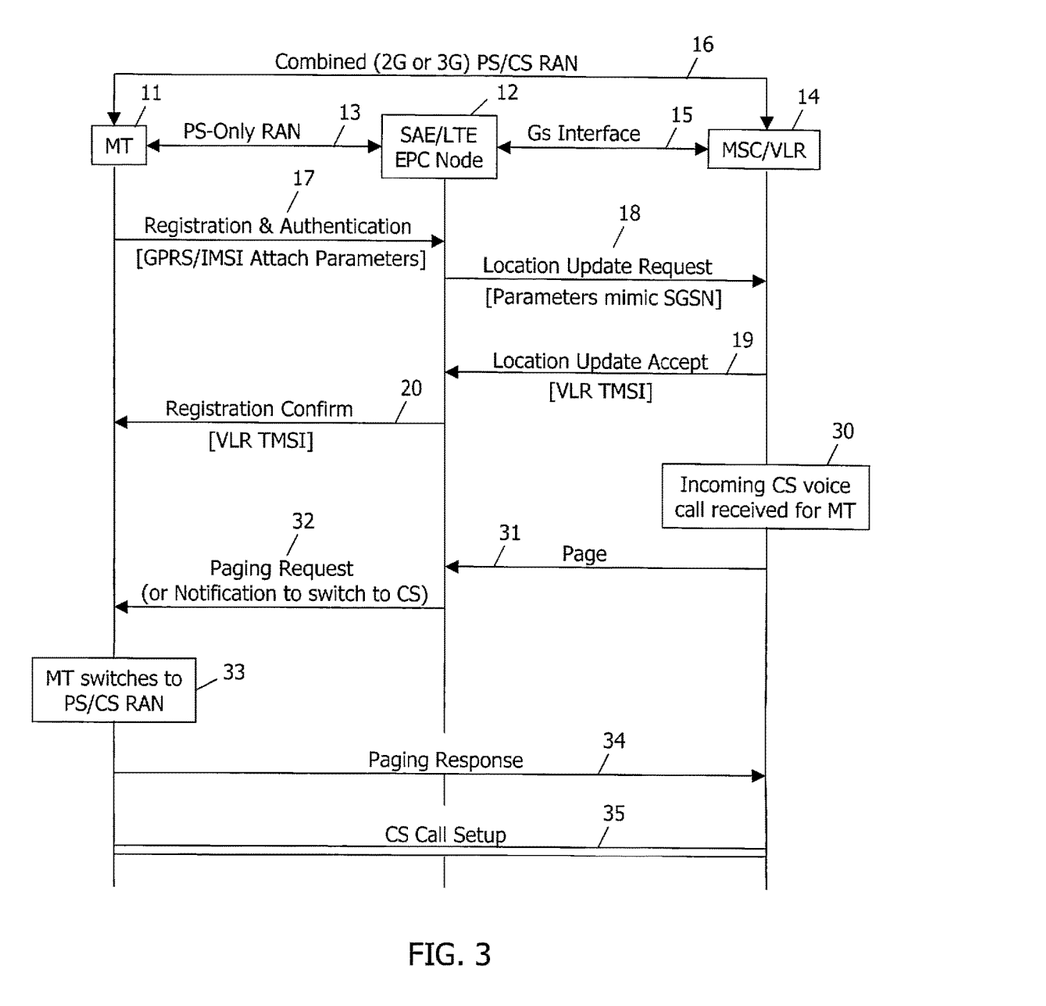
FIG. 3 is a signaling diagram illustrating the flow of messages between various network entities when a mobile terminal receives a CS voice call while operating in a PS-only network in an exemplary embodiment of the system and method of the present invention.

FIG. 3 is a signaling diagram illustrating the flow of messages between various network entities when a mobile terminal receives a CS voice call while operating in a PS-only network in an exemplary embodiment of the system and method of the present invention. Steps 17 through 20 illustrate the registration process as described above in connection with FIG. 1. At step 30, the MSC/VLR 14 receives an incoming CS call for the MT 11. At step 31, the MSC/VLR utilizes the Gs interface 15 to send a Page message to the EPC node 12 identifying the MT. At step 32, the EPC node sends the equivalent of a Paging Request message to the MT. Alternatively, this message may be an end-user message notifying the end user to manually initiate the change of radio network usage from the PS-only SAE/LTE network to the 2G/3G network. At step 33, the MT performs the procedures to switch from the PS-only SAE/LTE network to the 2G/3G network. At step 34, the MT sends a Paging Response message directly to the MSC/VLR. Thereafter, at step 35, normal CS call setup procedures are performed between the MT and the MSC/VLR to accept and receive the incoming CS call.

It should be understood that the Paging Request message, which the MT recognizes as a CS-related message, is different from the PS-related message that the EPC node uses to invite the MT to participate in a PS data session. The MT recognizes the difference and sends the response to either the MSC/VLR or the EPC node accordingly.

Figure 4:
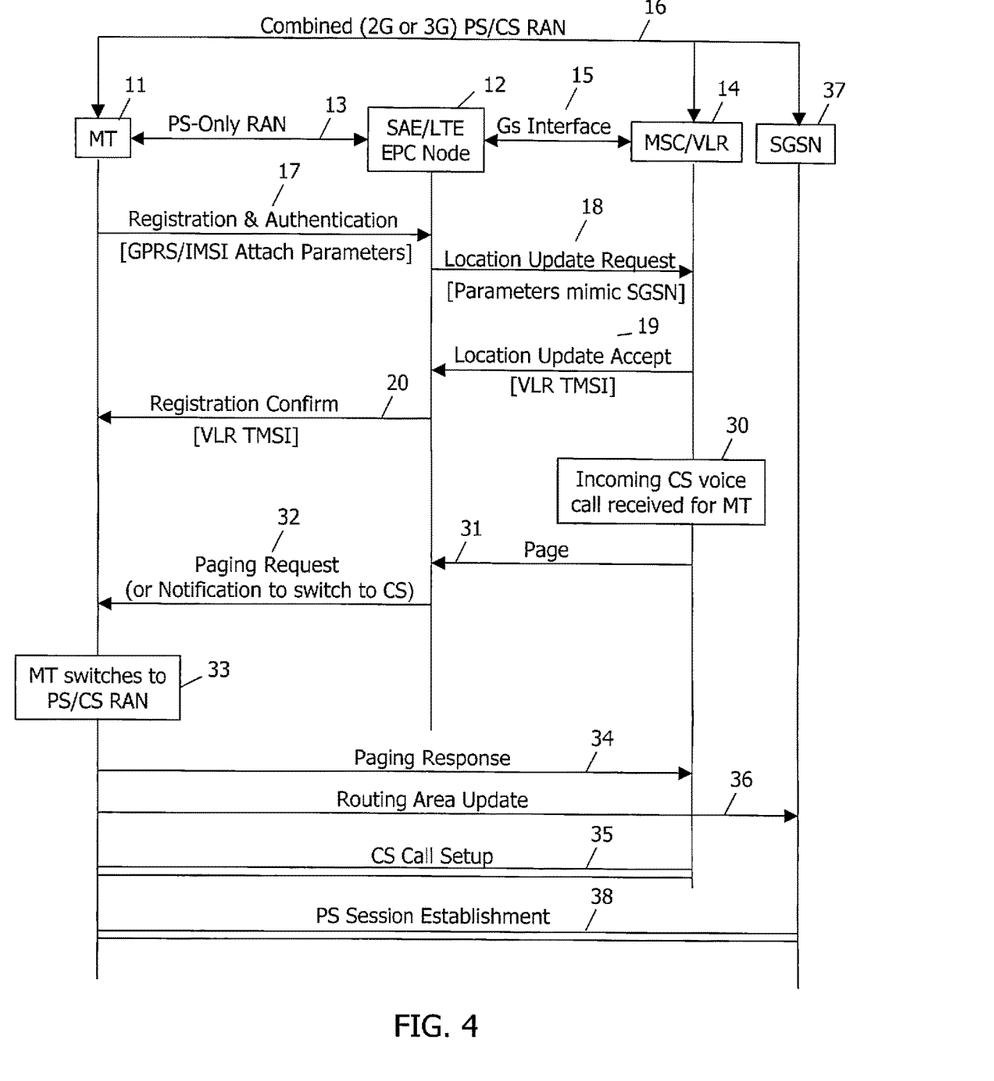
FIG. 4 is a signaling diagram illustrating the flow of messages between various network entities when a mobile terminal receives a CS voice call while actively involved in data transmission in a PS-only network in an exemplary embodiment of the system and method of the present invention.

FIG. 4 is a signaling diagram illustrating the flow of messages between various network entities when a mobile terminal receives a CS voice call while actively involved in data transmission in a PS-only network in an exemplary embodiment of the system and method of the present invention. Steps 17 through 20 illustrate the registration process as described above in connection with FIG. 1. At step 29, a PS session is established between the MT 11 and the EPC node 12. If the MT 11 is actively involved in data transmission in a packet session in the PS-only network at the time the notification of an incoming CS voice call is received at step 30, procedures may be utilized to also move the packet session from the PS-only network to the combined PS/CS network. As a result, the mobile end user is able to continue the packet session in the combined PS/CS network (although with less bandwidth), while also being able to receive the CS call. In one embodiment, when the MT receives the Paging Request message 32, the MT answers by sending both a Page Response message 34 to the MSC/VLR 14, and a Routing Area Update message 36 to its SGSN 37 to announce its presence in the 2G/3G PS network. Thereafter, at step 35, normal CS call setup procedures are performed between the MT and the MSC/VLR to accept and receive the incoming CS call. Likewise, normal PS session establishment procedures 38 are performed between the MT and the SGSN to reestablish the data session in the 2G/3G PS network.

Figure 5:
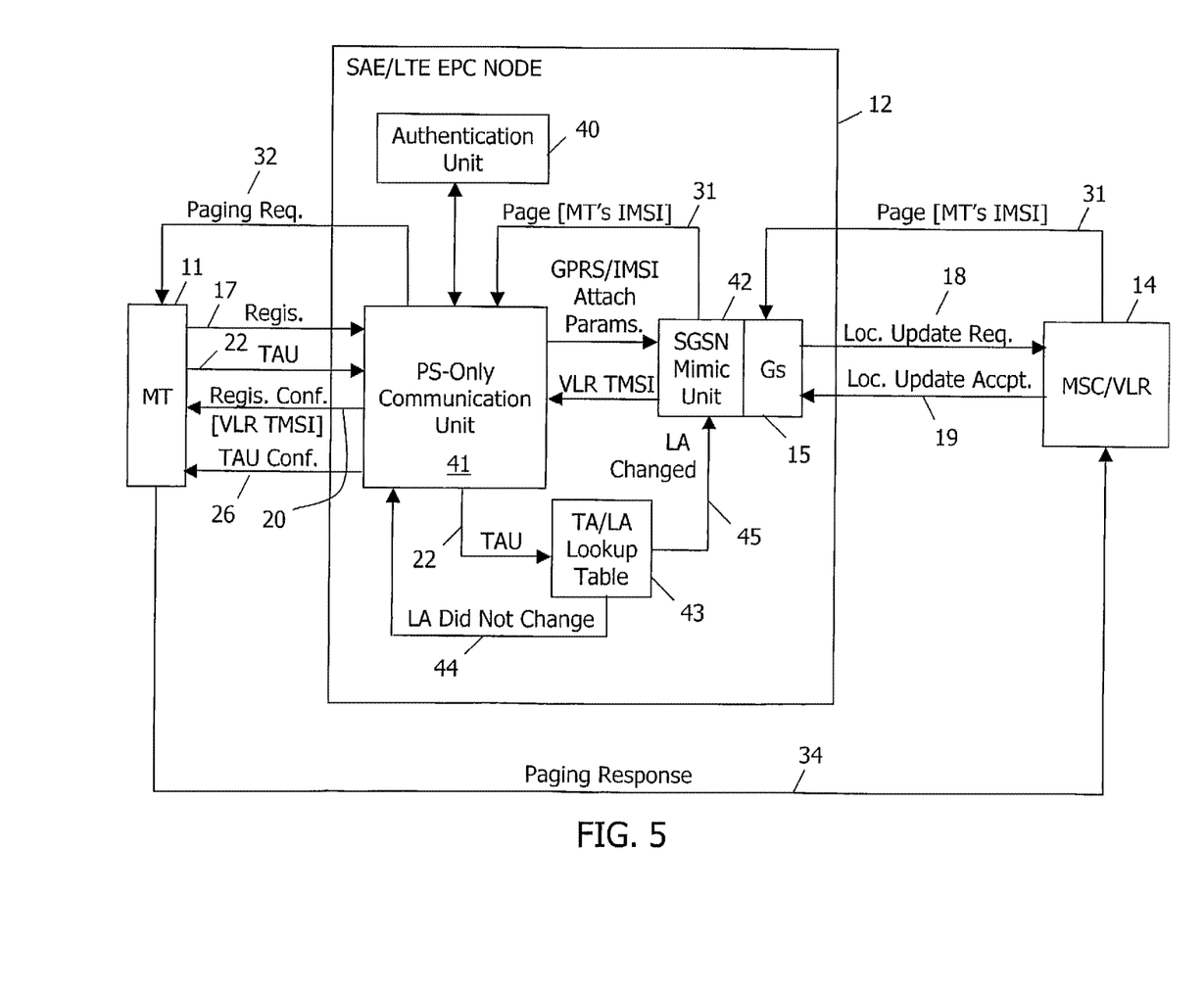
FIG. 5 is a simplified block diagram of an exemplary embodiment of a PS network node as taught by the present invention.

FIG. 5 is a simplified block diagram of an exemplary embodiment of a PS network node as taught by the present invention. In the illustrated embodiment, the network node is an EPC node 12 in an SAE/LTE network. Network nodes in other types of PS-only networks may also be utilized. The EPC node includes a PS-only communication unit 41, which communicates with the MT 11 operating in the PS-only network. The PS-only communication unit receives and sends the various messages 17, 20, 22, and 26 shown and described in FIGS. 1-4. When the PS only communication unit receives the Registration message 17, it authenticates the MT with an Authentication Unit 40. The PS-only communication unit then forwards message parameters to an SGSN mimic unit 42 enabling the SGSN mimic unit to mimic SGSN signaling over the Gs interface 15 to the MSC/VLR 14. In the illustrated example, the forwarded parameters are the parameters from a GPRS/IMSI Attach message. The SGSN mimic unit then sends the Location Update Request message 18 to the MSC/VLR 14. The MSC/VLR returns the Location Update Accept message 19, which as noted earlier, includes the VLR TMSI. The SGSN mimic unit forwards the VLR TMSI to the PS-only communication unit, which sends the VLR TMSI to the MT 11 in the Registration Confirm message 20.

When the EPC node 12 receives a TAU message 22 from the MT 11, the PS-only communication unit 41 forwards the TAU to a TA/LA lookup table 43. The TA/LA lookup table determines whether the change of Tracking Area in the TAU message also resulted in a change of Location Area. If the Location Area did not change, the TA/LA lookup table reports this fact at 44 to the PS-only communication unit 41, which sends the TAU confirm message 26 to the MT. If the change of Tracking Area also resulted in a change of Location Area, the TA/LA lookup table reports this fact at 45 to the SGSN mimic unit 42. The SGSN mimic unit uses the Gs interface 15 to send the Location Update Request message 18 to the MSC/VLR 14. The MSC/VLR returns the Location Update Accept message 19 to the EPC node, and any new VLR TMSI information is reported to the MT in the TAU Confirm message 26.

When the MSC/VLR 14 receives a CS voice call for the MT 11, the MSC/VLR sends the Page message 31 over the Gs interface 15 to the EPC node 12. The Page message includes an identifier for the MT such as the MT's IMSI. The SGSN mimic unit 41 passes the Page to the PS-only communication unit 41, which sends the Paging Request 32 to the MT. The MT then sends the Paging Response directly to the MSC/VLR 14.

Figure 6:
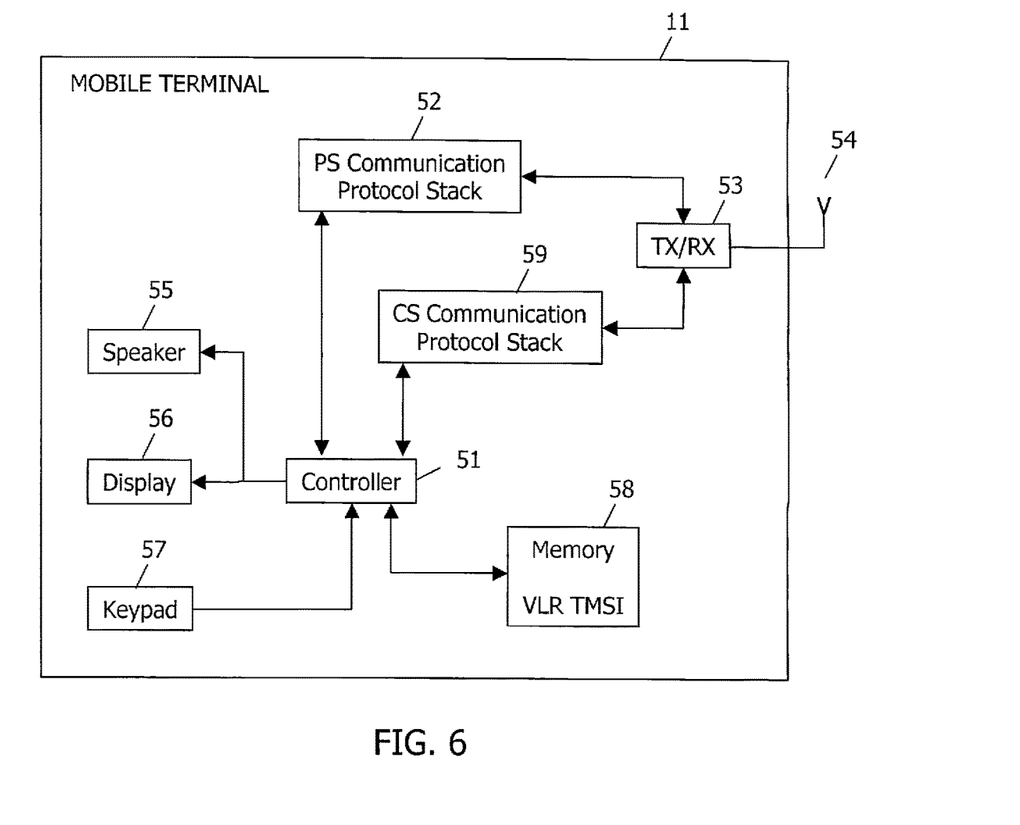
FIG. 6 is a simplified block diagram of an exemplary embodiment of a mobile terminal as taught by the present invention.

FIG. 6 is a simplified block diagram of an exemplary embodiment of a mobile terminal (MT) 11 as taught by the present invention. When the MT is operating in a PS-only network, a controller 51 controls a PS communication protocol stack 52, which sends and receives messages 17, 20, 22, and 26 through a transceiver (TX/RX) 53 and an antenna 54. When there is an incoming CS voice call for the MT, the EPC node 12 may send an end-user message to the MT notifying the end user to manually initiate a change of radio network usage from the PS-only network to a 2G/3G network supporting CS calls. The controller may notify the user through a speaker 55 or a visual display 56. The user may indicate the desire to accept the CS voice call through a keypad 57. The controller then retrieves the VLR TMSI from memory 58 and causes a CS communication protocol stack 59 to construct and send the Paging Response 34 utilizing the transceiver 53 and the antenna 54.

In an alternative embodiment, the MT is capable of automatically switching to the 2G/3G network. When the MT receives the Paging Request 32 indicating that there is an incoming CS voice call for the MT, the controller automatically switches from the PS communication protocol stack 52 to the CS communication protocol stack 58 to construct and send the Paging Response 34 utilizing the transceiver 53 and the antenna 54.

The controller 51 recognizes the Paging Request message as being a CS-related message, and thus uses the CS communication protocol stack 58 to send the Paging Response to the MSC/VLR 14. The controller also recognizes when the EPC node 12 sends a PS-related invitation to participate in a PS data session. In this case, the controller uses the PS communication protocol stack 52 to send a response to the EPC node.

If the MT 11 is actively involved in data transmission in a packet session in the PS-only network at the time the notification of an incoming CS voice call is received, the procedures discussed above in connection with FIG. 4 may be utilized to also move the packet session from the PS-only network to the 2G/3G network. As a result, the mobile end user is able to continue the packet session in the combined PS/CS network (although with less bandwidth), while also being able to receive the CS call. When the MT receives the Paging Request message 32, the controller retrieves the VLR TMSI from memory 58 and causes the CS communication protocol stack 59 to send a Page Response message 34 to the MSC/VLR 14. The controller also sends a Routing Area Update message 36 to the MT's SGSN 37 to announce its presence in the 2G/3G PS network. Thereafter, normal CS call setup procedures are performed between the MT and the MSC/VLR to accept and receive the incoming CS call. Likewise, normal PS session establishment procedures are performed between the MT and the SGSN to reestablish the data session in the 2G/3G PS network.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method of providing a circuit-switched (CS) voice call to a mobile terminal operating in a packet-switched-only wireless telecommunication network, said method comprising:
   in a control node in the packet-switched-only network, emulating the messaging functionality of a Serving GPRS Service Node (SGSN);
   connecting the control node in the packet-switched-only network to a mobile switching center/visitor location register (MSC/VLR) in a CS network through an interface;
   receiving by the control node, a Paging Request from the MSC/VLR utilizing the interface; and
   sending an equivalent of a CS paging request message from the control node to the mobile terminal in the packet-switched-only network, the equivalent of the CS paging request message indicating the MSC/VLR has received an incoming CS voice call for the mobile terminal, wherein the equivalent of the CS paging request message causes the mobile terminal to send a CS paging response directly to the MSC/VLR.

2. The method according to claim 1, further comprising, after the connecting step, the steps of:
   registering the mobile terminal with the MSC/VLR by sending a first message from the control node in the packet-switched-only network to the MSC/VLR, said first message including parameters that mimic parameters sent by a Serving GPRS Service Node (SGSN);
   receiving by the control node via the interface, an identifier for the MSC/VLR; and
   forwarding the identifier for the MSC/VLR to the mobile terminal.

3. The method according to claim 2, further comprising:
   receiving by the control node in the packet-switched-only network, a request from the packet-switched-only network to establish a data session with the mobile terminal; and
   forwarding the request to the mobile terminal for direct response to the control node.

4. The method according to claim 1, further comprising:
   performing CS call setup procedures in the CS network to set up the CS voice call with the mobile terminal.

5. The method according to claim 1, wherein the MSC/VLR is in a combined CS/PS network that also includes an SGSN, and the mobile terminal is actively involved in a PS data session in the packet-switched-only network when the equivalent of the CS paging request message is received from the control node, said method further comprising:
   sending a paging response message from the mobile terminal to the MSC/VLR;
   performing CS call setup procedures in the combined CS/PS network to set up the CS voice call with the mobile terminal;
   sending a routing area update message from the mobile terminal to the SGSN, said routing area update message announcing the mobile terminal's presence in the combined CS/PS network; and
   performing PS session establishment procedures in the combined CS/PS network to reestablish the PS data session with the mobile terminal.

6. The method according to claim 2, further comprising:
   receiving by the control node in the packet-switched-only network, a tracking area update message from the mobile terminal, the tracking area update message indicating that the mobile terminal has changed tracking areas in the packet-switched-only network;
   determining by the control node in the packet-switched-only network, whether the mobile terminal has also changed location areas associated with the CS network; and
   if the mobile terminal has also changed location areas:
   sending a location update message from the control node in the packet-switched-only network to the MSC/VLR; and sending a confirmation message from the control node in the packet-switched-only network to the mobile terminal; and if the mobile terminal has not changed location areas, sending the confirmation message from the control node in the packet-switched-only network to the mobile terminal.

7. A control node in a packet-switched-only wireless telecommunication network, comprising:
   a packet-switched communication unit that wirelessly communicates with a mobile terminal operating in the packet-switched-only network;
   a Serving GPRS Service Node (SGSN) emulation unit that emulates the messaging functionality of an SGSN; and
   an interface connection from the SGSN emulation unit to a mobile switching center/visitor location register (MSC/VLR) in a circuit-switched (CS) network;
   wherein the control node receives a Paging Request from the MSC/VLR utilizing the interface connection, and the packet-switched communication unit sends an equivalent of a CS paging request message from the control node to the mobile terminal in the packet-switched-only network, the equivalent of the CS paging request message indicating the MSC/VLR has received an incoming CS voice call for the mobile terminal, wherein the equivalent of the CS paging request message causes the mobile terminal to send a CS paging response directly to the MSC/VLR.

8. The control node according to claim 7, wherein:
   the packet-switched communication unit and the SGSN emulation unit forward registration information from the mobile terminal to the MSC/VLR, and forward an identifier for the MSC/VLR to the mobile terminal.

9. The control node according to claim 7, further comprising:
   a signaling unit that receives a request from the packet-switched-only network to establish a data session with the mobile terminal;
   wherein the packet-switched communication unit forwards the request to the mobile terminal for direct response to the control node.

10. The control node according to claim 7, wherein the control node in the packet-switched-only network receives a tracking area update message from the mobile terminal, the tracking area update message indicating that the mobile terminal has changed tracking areas in the packet-switched-only network, and the control node further comprises:
    a comparing unit that determines whether the mobile terminal has also changed location areas associated with the CS network;
    wherein, if the mobile terminal has also changed location areas, the control node in the packet-switched-only network sends a location update message to the MSC/VLR; and
    wherein, if the mobile terminal has not changed location areas, the control node in the packet-switched-only network sends a confirmation message to the mobile terminal.

11. A mobile terminal for receiving a circuit-switched (CS) voice call while operating in a packet-switched-only wireless telecommunication network, said mobile terminal comprising:
    a packet-switched communication protocol stack that sends and receives messages with a control node in the packet-switched-only network, wherein the control node emulates the messaging functionality of a Serving GPRS Service Node (SGSN) and is connected by an interface connection to a mobile switching center/visitor location register (MSC/VLR) in a CS network;
    a circuit-switched communication protocol stack that sends and receives messages with the MSC/VLR in the CS network; and
    a controller that determines when to use the packet-switched communication protocol stack and when to use the circuit-switched communication protocol stack, wherein:
    the controller determines whether a paging request message received from the packet-switched-only network is an invitation to participate in a data session in the packet-switched-only network, or is an invitation to accept an incoming CS voice call;
    wherein the controller utilizes the packet-switched communication protocol stack to send a response to a control node in the packet-switched-only network upon determining that the paging message is an invitation to participate in a data session in the packet-switched-only network; and
    wherein the controller utilizes the circuit-switched communication protocol stack to send a response directly to the MSC/VLR upon determining that the paging message is an invitation to accept an incoming CS voice call.

12. The mobile terminal according to claim 11, wherein the paging request message is an invitation to accept an incoming CS voice call, and in response, the controller performs CS call setup procedures with the CS network to set up the CS voice call.

13. The mobile terminal according to claim 11, wherein the MSC/VLR is in a combined CS/PS network that also includes a Serving GPRS Service Node (SGSN), and the mobile terminal is actively involved in a PS data session in the packet-switched-only network when a paging request message is received inviting the mobile terminal to accept an incoming CS voice call, wherein:
    the controller performs CS call setup procedures in the combined CS/PS network to set up the CS voice call;
    the controller sends a routing area update message from the mobile terminal to the SGSN, the routing area update message announcing the mobile terminal's presence in the combined CS/PS network; and
    the controller performs PS session establishment procedures in the combined CS/PS network to reestablish the PS data session.

* * * * *

UNITED STATES PATENT AND TRADEMARK OFFICE
CERTIFICATE OF CORRECTION

PATENT NO. : 9,596,713 B2  Page 1 of 2
APPLICATION NO. : 14/876838
DATED : March 14, 2017
INVENTOR(S) : Sander It is certified that error appears in the above-identified patent and that said Letters Patent is hereby corrected as shown below:

On the Title Page

In Item (63), under "Related U.S. Application Data", in Column 1, Line 2, delete "2015," and insert -- 2015, now Pat. No. 9,191,984, --, therefor.

On Page 2, in Item (56), under "OTHER PUBLICATIONS", in Column 2, Line 2, delete "Generatl" and insert -- General --, therefor.

On Page 2, in Item (56), under "OTHER PUBLICATIONS", in Column 2, Line 14, delete "W.0.0" and insert -- V7.0.0 --, therefor.

In the Specification

In Column 1, Line 11, delete "2015," and insert -- 2015, now U.S. Pat. No. 9,191,984, --, therefor.

In Column 1, Line 17, delete "REASEARCH" and insert -- RESEARCH --, therefor.

In Column 3, Line 48, delete "DRAWING" and insert -- DRAWINGS --, therefor.

In Column 4, Line 40, delete "Center" and insert -- Register --, therefor.

In Column 5, Line 18, delete "MSC/CLR" and insert -- MSC/VLR --, therefor.

In Column 6, Line 58, delete "SGSN mimic unit 41" and insert -- SGSN mimic unit 42 --, therefor.

In Column 7, Line 17, delete "CS communication protocol stack 58" and insert -- CS communication protocol stack 59 --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,596,713 B2

In Column 7, Lines 22-23, delete "CS communication protocol stack 58" and insert -- CS communication protocol stack 59 --, therefor.